US012537322B2

(12) United States Patent
Bartek

(10) Patent No.: US 12,537,322 B2
(45) Date of Patent: Jan. 27, 2026

(54) SYSTEMS AND METHODS FOR PROVIDING LED CONNECTORS

(71) Applicant: Hardware Resources, Inc., Farmers Branch, TX (US)

(72) Inventor: Jay Bartek, Kearney, NE (US)

( * ) Notice: Subject to any disclaimer, the term of this patent is extended or adjusted under 35 U.S.C. 154(b) by 404 days.

(21) Appl. No.: 17/569,201

(22) Filed: Jan. 5, 2022

(65) Prior Publication Data

US 2023/0072195 A1 Mar. 9, 2023

Related U.S. Application Data

(63) Continuation-in-part of application No. 29/806,567, filed on Sep. 3, 2021, now Pat. No. Des. 996,371, and a continuation-in-part of application No. 29/806,561, filed on Sep. 3, 2021, now Pat. No. Des. 996,369, and a continuation-in-part of application No. 29/806,563, filed on Sep. 3, 2021, now Pat. No. Des. 996,370.

(51) Int. Cl.

*H01R 12/61* (2011.01)
*F21V 23/06* (2006.01)
*H01R 12/63* (2011.01)
*F21Y 115/10* (2016.01)

(52) U.S. Cl.

CPC ........... *H01R 12/613* (2013.01); *F21V 23/06* (2013.01); *H01R 12/63* (2013.01); *F21Y 2115/10* (2016.08)

(58) Field of Classification Search

CPC ........ H01R 33/94; H01R 27/02; H01R 12/81; H01R 4/36; H01R 25/145; H01R 12/613; F21V 23/06; F21Y 2115/10

See application file for complete search history.

(56) References Cited

U.S. PATENT DOCUMENTS

| | | | | |
|---|---|---|---|---|
| 7,758,358 | B1 * | 7/2010 | Mier-Langner | H01R 25/145 362/648 |
| 9,909,743 | B2 * | 3/2018 | Dankelmann | F21V 21/005 |
| 10,024,526 | B1 * | 7/2018 | Dankelmann | F21V 23/06 |
| 10,591,114 | B1 * | 3/2020 | Lassen | F21V 15/013 |
| 10,826,202 | B1 * | 11/2020 | Lowe | H01R 35/04 |
| 11,428,396 | B2 * | 8/2022 | Kalliche | F21S 4/20 |
| 11,796,165 | B2 * | 10/2023 | Flynn | H01R 4/32 |
| 2015/0303632 | A1 * | 10/2015 | Tremaine | H01R 43/20 439/626 |
| 2021/0234288 | A1 * | 7/2021 | Latorre | H01R 4/48365 |
| 2023/0122060 | A1 * | 4/2023 | Johnson | H01R 4/5091 439/364 |

FOREIGN PATENT DOCUMENTS

| | | | | |
|---|---|---|---|---|
| EP | 2075875 A1 | * | 7/2009 | H01R 4/304 |
| GB | 2582046 A | * | 9/2020 | H01R 4/36 |

* cited by examiner

*Primary Examiner* — Marcus E Harcum

(74) *Attorney, Agent, or Firm* — Husch Blackwell LLP

(57) ABSTRACT

Connectors for LED strips are disclosed having channels for removable conductors. These connectors are configured to receive conductors adapted to electrically connect two LED strips, or a single LED strip and an appropriate number of wires. The connectors and conductors may include sloped ramps that provide support to the LED strips.

15 Claims, 10 Drawing Sheets

SYSTEMS AND METHODS FOR PROVIDING LED CONNECTORS

CROSS-REFERENCE TO RELATED APPLICATIONS

The present application is a continuation-in-part of U.S. Design patent application Ser. No. 29/806,561, filed Sep. 3, 2021, entitled "LED Connector"; U.S. Design patent application Ser. No. 29/806,563, filed Sep. 3, 2021, entitled "LED Connector"; and U.S. Design patent application Ser. No. 29/806,567, filed Sep. 3, 2021, entitled "LED Conductor"; all of which are hereby incorporated by reference for all purposes.

BACKGROUND

Technical Field

The invention generally relates to light emitting diode (LED) light strips, and more specifically pertains to connectors for LED tape.

Background

Light strips, such as flexible LED light strips, have become increasingly popular in various applications such as, for example, under cabinet lighting, TV back lighting, staircase lighting, architectural lighting, bar lighting, kitchen lighting, toe kick lighting, ceiling cove lighting, decorations, and on vehicles. A flexible LED light strip is often comprised of a flexible strip of material, a plurality of LEDs attached along the front surface of the flexible strip of material, and a length of adhesive along the back surface of the flexible strip. The LEDs on the light strip may emit the same light, may emit multiple colors, or may change colors to provide a range of lighting options. During the manufacturing process, shorter strips of linear lighting are connected together to form a finished strip of linear lighting having essentially any length. For example, spools of flexible linear lighting 100 feet (30 meters) long are common and 400-foot (122 meter) spools of flexible linear lighting or longer are commercially available.

Most conventional flexible LED light strips utilize a low-voltage 12V DC electrical power. The circuits on a printed circuit board (PCB) of a strip of linear lighting are usually physically and electrically arranged in repeating blocks, so that the PCB can be cut at defined cut points between adjacent repeating blocks. In some cases, linear lighting is cut to a desired length and connected to power during finishing steps at the factory. In other cases, linear lighting may be cut to length in the field by an electrician or other individual who is installing it in a particular location.

During installation of flexible LED light strips, at least one end of the flexible LED light strip is physically and electrically connected to a connector (e.g., DC power coupler, splice connector, etc.). The end of the flexible LED light strip may be attached by soldering the LED light strip to the connector. While these sorts of connections are considered to be reliable, soldering is time consuming, takes practice, and is best done under controlled conditions by a skilled technician. A poor solder joint can quickly fail and, in extreme cases, result in the destruction of the PCB. Even someone skilled at soldering may have difficulty making good solder joints while attempting to install linear lighting in a cramped space. Compounding these issues is the fact that many consumers do not have a soldering iron or the desire to solder the connections.

To eliminate the need for soldering the light strip to a connector, solderless connectors have been introduced into the marketplace. These types of connectors allow for a solderless connection between a strip of linear lighting and power leads or between two strips of linear lighting. For example, flat flexible cable (FFC) connectors are one solderless solution that efficiently connects a light strip to a connector. With an FFC connector, the LED light strip is physically secured within a clasp, a clam shell connector, a flip lock structure, or a slide lock structure. For example, U.S. Pat. No. 9,239,136, entitled Connector for Light-Emitting Diode Strip, which is hereby incorporated herein by reference, discloses one such set of connectors. However, with connectors of this type, there is often no support structure to prevent movement of the light strip with respect to the connector and only the actual connection supports the light strip making it can be difficult to maintain a positive connection to the PCB. In another example, U.S. Pat. No. 10,591,114, entitled Connectors for Linear Lighting, which is incorporated herein by reference, a type of solderless connector for connecting linear lighting to either wires or another strip of linear lighting is provided. However, there are still potential issues with this design. For example, such connectors receive the strip of linear lighting in a raised slot. The vertical height of the raised slot induces strain in the linear lighting and creates non-uniform light output near the connector.

One of the problems with conventional connectors for flexible LED light strips is that over a period of time forces applied to the connector and the light strip can result in the failure of the electrical connection between the light strip and the connector. The failure of the flexible LED light strip can require costly maintenance and disappointment. Another problem with conventional flexible LED light strips is that installation can be difficult and time consuming for the average consumer.

Because of the inherent problems with the related art, there is a need for a new and improved LED strip light connector system for providing reliable connections for flexible LED light strips.

SUMMARY OF THE INVENTION

The invention generally relates to embodiments of connectors for flexible flat light strips adapted to couple ends of flexible flat light strips together and/or to electrical wires. One aspect of the invention relates to connectors for connecting a strip of linear lighting to wires or to another strip of linear lighting. In one embodiment, the connector includes a connector body with a support ramp extending outwardly from at least one side of the connector body to support the light strip near the connector body. The ramp may have a slight downward angle, tapering down in thickness as it extends away from the connector body. In some embodiments, both sides of the connector body may have ramps. The light strip may be attached to the surface of the support ramp thereby preventing movement of the light strip with respect to the connector. The ramp may provide also additional support to the LED strip and potentially eliminate a strain on the linear light strip near the connector body that might otherwise be caused by the height of the slot in which the linear lighting is received.

In another embodiment, the connector may include a connector body with LED conductors positioned inside. The LED conductors span the connector body to electrically connect one end to the other. A wall may be disposed between two internal slots in the connector body such that, when the LED conductors are positioned inside, the wall prevents electrical contact between the two LED conductors. Depending on the embodiment, the ends of the LED conductors may be adapted either to connect to metal pads or other such contacts on a strip of linear lighting or to wires. If the LED conductors are adapted to receive a strip of linear lighting, the LED conductors may each include a support ramp. The connector body may include apertures in an upper surface thereof and each LED conductor may include apertures in an upper surface thereof configured to align with the apertures in the upper surface of the connector body such that a screw or other biasing member may be inserted and tightened to secure the strip of linear lighting and/or wires therein and/or to press the clips and/or wires against the LED conductors in order to make electrical contact.

Another aspect of the invention relates to the LED conductors inserted into a connector body for providing an electrical connection, in some embodiments, between two or more strips of linear lighting, between one or more strips of linear lighting and wires, or between one or more sets of wires. The LED conductors have a first side and a second side, at least one of which may have a support ramp extending outwardly therefrom. At least one side of the LED conductors may include a receiving structure similar to that described above.

There has thus been broadly outlined some of the features of various embodiments of the invention in order that the detailed description may be better understood. The above summary is not intended to represent each embodiment or every aspect of the invention. Other aspects, features, and advantages will be set forth in the description that follows and particular embodiments may include one, some, or none of the listed advantages. In this respect, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
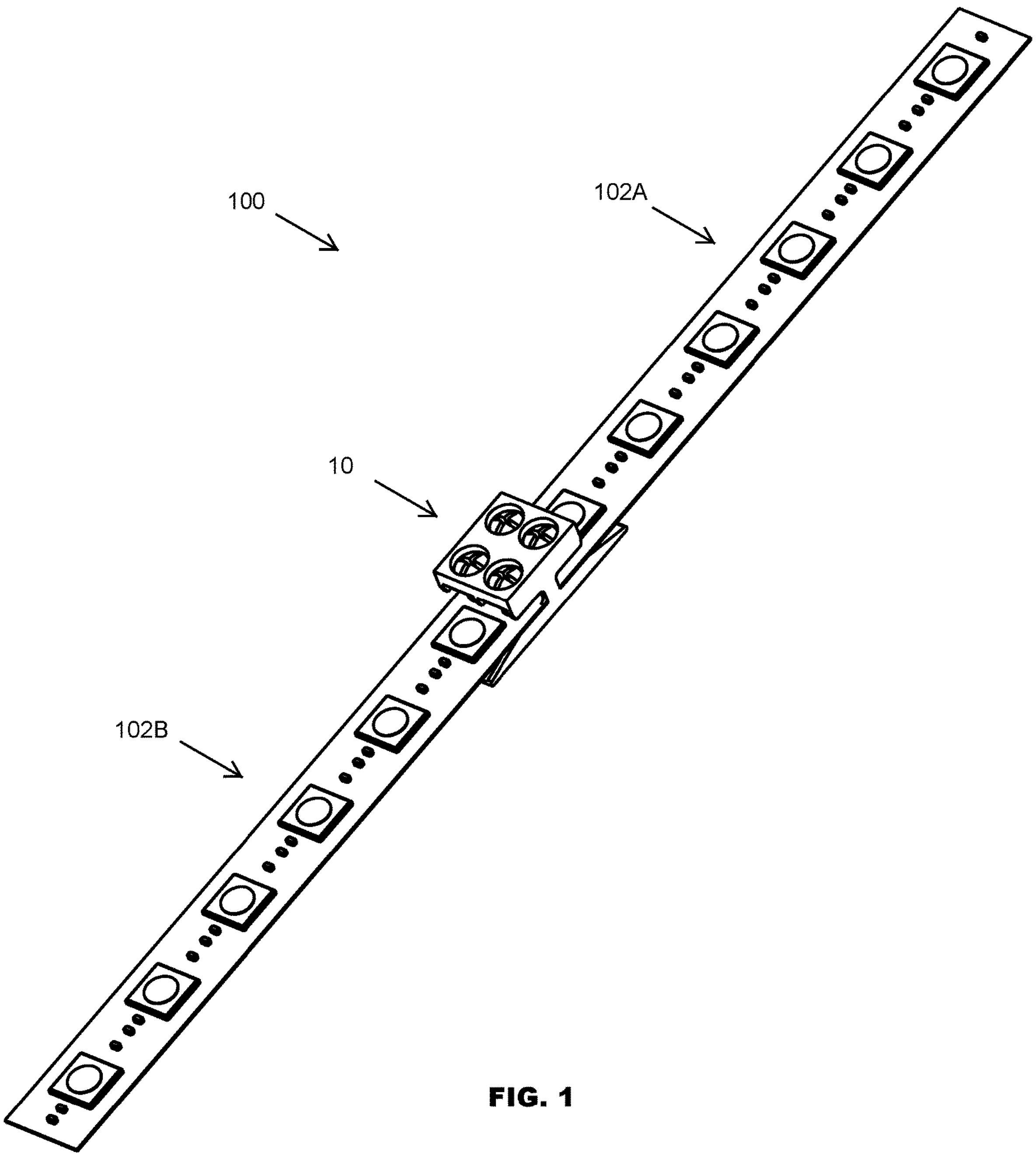
FIG. 1 is an LED connector coupled to two LED strips in accordance with an embodiment of the present invention.

The present invention is directed towards systems and methods for providing LED connectors. FIG. 1 is a perspective view of an LED connection system 100 having an LED connector body 10 coupled to a first LED strip 102A and a second LED strip 102B. The connector body 10 may be constructed and arranged to connect a strip of linear lighting to wires (not shown), to connect a strip of linear lighting to another strip of linear lighting (shown in FIG. 1), or to connect two sets of wires (not shown). The embodiment shown is configured to make two electrical connections, but in other embodiments, there could be any number of electrical connections made. Typically, the first set of wires and/or electrical connections of a first LED strip would carry power to the second set of wires and/or second LED strip. However, the type of power and/or signal that the wires and/or connections carry may vary. More specifically, the strip of linear lighting may have a plurality of LEDs mounted on it, spaced apart at a regular pitch or spacing. An LED may refer to one or more LEDs in a package suitable for mounting on a PCB and/or flexible tape. While some LED strips emit a single color, others may emit multiple colors, and/or the color temperature and/or brightness may be varied. Oftentimes, these types of LED strips require additional signals for control and may thus require additional wires and/or other inputs.

Figure 2:
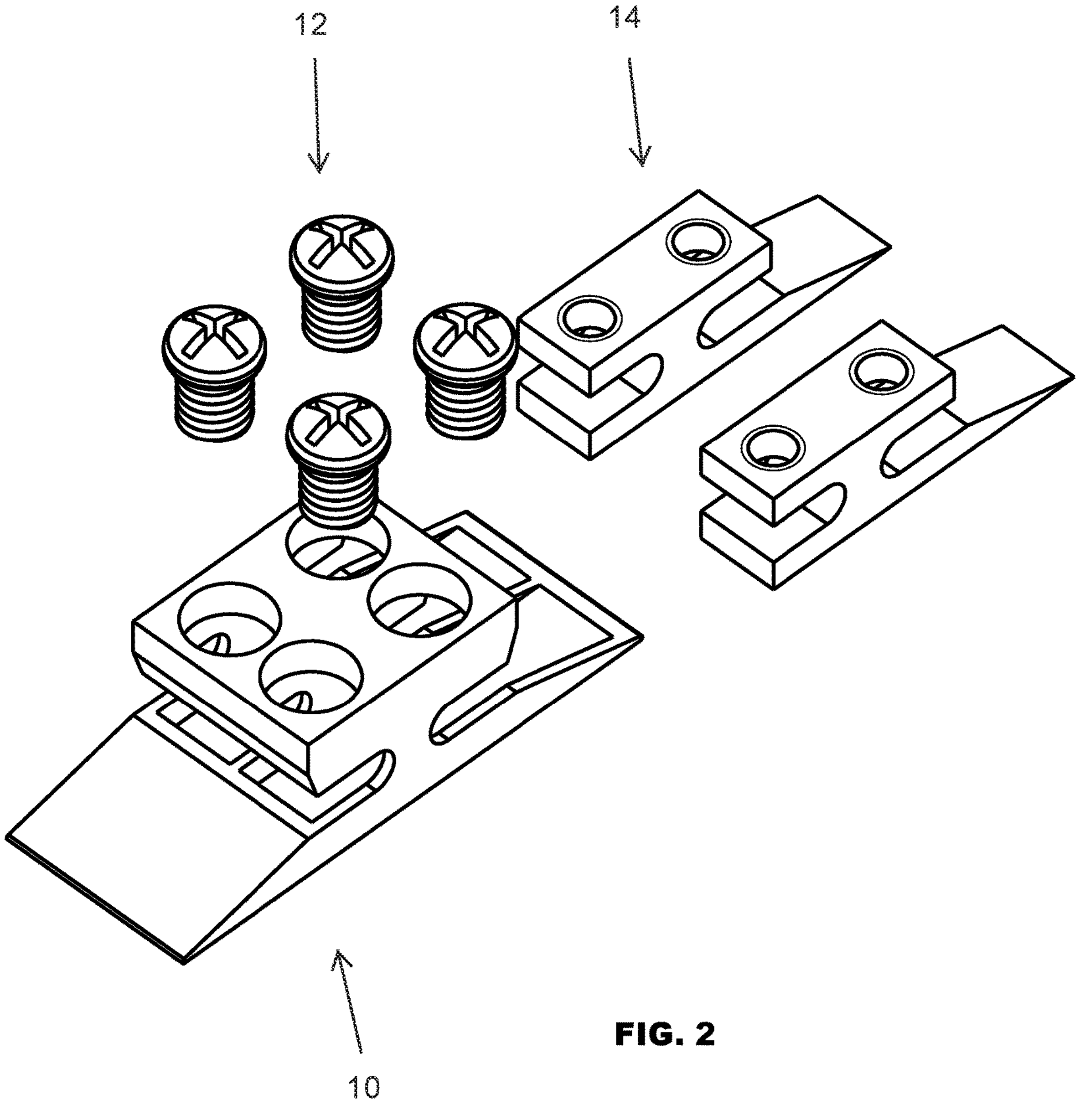
FIG. 2 is an exploded perspective view of an LED connector system in accordance with an embodiment of the present invention.

FIG. 2 is an exploded view of an embodiment of an LED connection system having a connector body 10, screws 12, and LED conductors 14. The connector body 10 according to various embodiments may be configured to accommodate receiving more than two LED strips and/or more or less than two wires or other inputs or outputs on each side or on multiple sides. A preferred embodiment described herein assumes an LED strip being powered by two wires from, for example, a low voltage power source. While the definition of "low voltage" varies depending on the application, for purposes of this description, voltages under about 50V will be considered to be low voltage. However, the connector system could facilitate higher voltage and/or other inputs in various embodiments.

In the embodiment shown in FIG. 2, the connector body 10 includes two channels for receiving two LED conductors 14 therein. After an LED conductor 14 has been inserted into each channel, an LED strip or wires may be received in a first side of the connector body 10 and an LED strip or wires may be received in a second side of the connector 10 body opposite the first side. Although the connector body 10 is shown having channels on one side thereof, according to some embodiments, the connector body 10 may have channels on two or more sides thereof. In many applications, it may be desirable to turn corners, or to otherwise position one LED strip at an angle to another LED strip or wires. Although the two sides are shown as being aligned linearly, in other embodiments, the two sides may be at an angle to each other to receive LED strips or wires to form a non-parallel connection. In such an embodiment, the wires and/or LED strip may be inserted further into the connector body 10 and/or bent to match the bend of the connector body 10, one or more of the LED conductors 14 may be angled or bendable to match the angle of the connector body 10, and/or the connector body 10 may be internally configured to facilitate an electrical connection between the two sides of the connector body 10. Although the connector body 10 is shown having receiving slots on opposite sides thereof, according to various embodiments, the connector body 10 may be configured such that the receiving slots are on adjacent sides, for example, to form a connection at a corner or where the LED strips or wires are perpendicular to each other. Although not shown in FIG. 2, to facilitate the U-shaped portions of the LED conductors 14 to receive and secure wires therein, a pair of clips having, for example, an upper portion with an opening therein sized to allow a screw to pass therethrough, may be utilized to secure the wires and the electrical connection.

Figure 3:
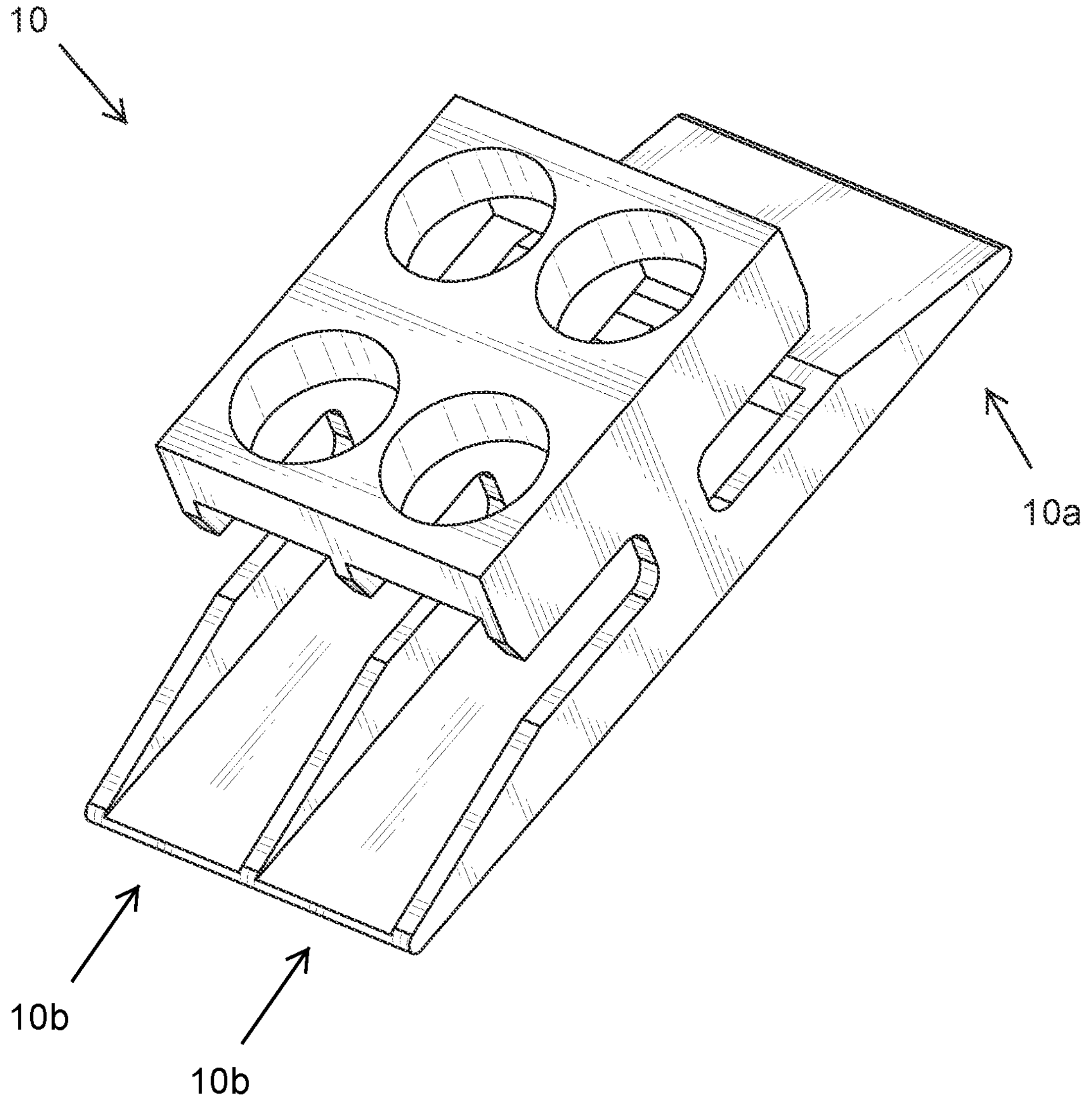
FIG. 3 is a perspective view of an embodiment of an LED connector body of the LED connector system of FIG. 1.
Figure 4:
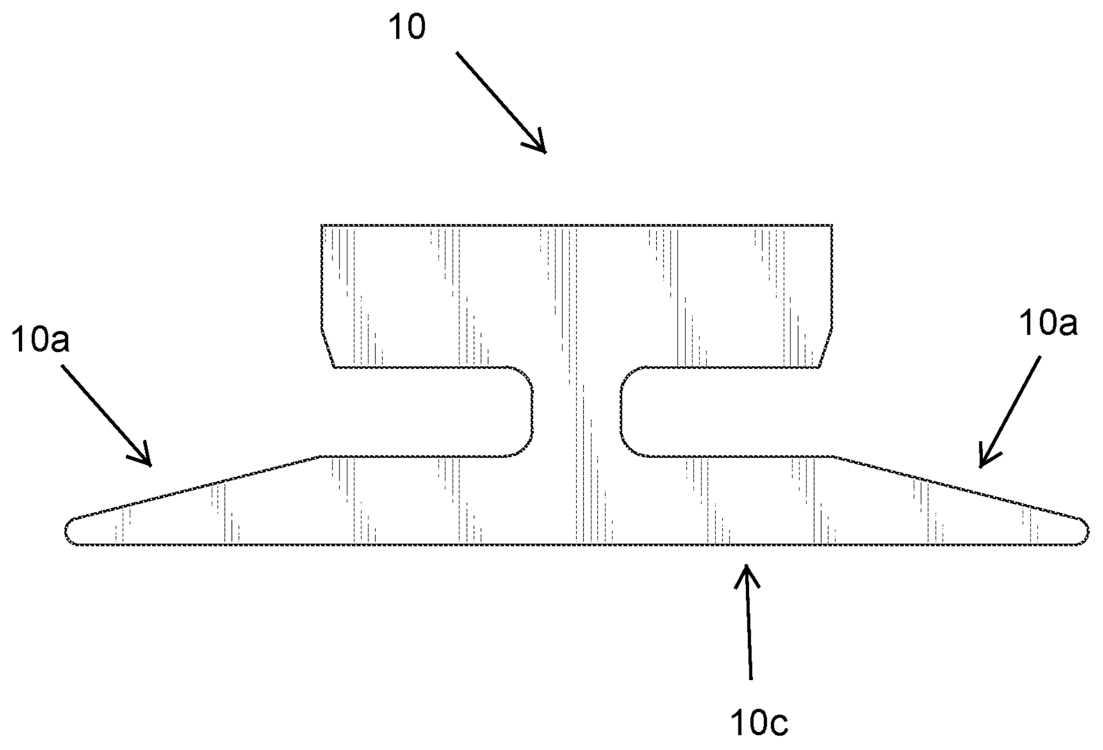
FIG. 4 is a side view of the LED connector body of FIG. 3.

FIG. 3 is a perspective view of an embodiment of a connector body 10 having a ramp 10*a* on one side thereof and channels 10*b* for receiving LED connectors (not shown) on an opposite side thereof. As can be seen in FIG. 4, the slots that receive the LED strips and/or wires may be elevated in relation to a base surface (not shown) on which the bottom surface 10*c* of the connector body 10 rests and/or is attached. The height difference between the level at which the components are received into the connector body 10 and the base surface may be enough to induce strain in the LED strip and/or the wires. Additionally, the height difference may cause a difference in perceived light intensity for the LEDs closest to the connector body 10. In order to address these issues, one or both sides of the connector body 10 may have a support ramp 10*a* and/or one or both sides of the LED conductors 14 (shown in FIG. 2) may have a support ramp that projects outwardly therefrom, in line with the LED strip and/or wires, to form a sloped ramp that provides for a gradual height transition. In such embodiments, a short length of the LED strip and/or a short length of each of the wires may rest on the ramp 10*a*. The ramp 10*a* may also provide some protection against electrically exposed areas of the LED strip and/or wires shorting against the base surface on which the connector body 10 rests.

In some embodiments, the ramps 10*a* may have different lengths, with some extending further than others. The ramps 10*a* may be any angle, although the ramps 10*a* need not make the same angle. Additionally, the ramps 10*a* may have only a slight taper in thickness as they extend away from the connector body 10. However, in other cases, the thickness of each ramp 10*a* may taper down more substantially or more gradually as the ramp 10*a* extends away from the connector body 10.

The connector body 10 may be made of an insulating material, such as a plastic, or may contain an insulating coating. For example, polycarbonate and acrylic plastics may be suitable for the connector body 10. The connector body 10 may be transparent or opaque, which may be helpful in that it may create less of a dark spot between two connected LED strips or between the LED strip and its wires. FIG. 4 shows most clearly that the ramps 10*a* on either side of the connector body 10 may be symmetrical, with each side having a similar slope, such that two LED strips would be received at the same vertical height. In other embodiments, the bottom surface 10*c* of the connector body 10 may be asymmetrical, with one side raised above the other, such that the LED strips would be received at the same vertical height despite the base surface on which the connector body 10 sits being uneven, or the ramps 10*a* may raise to different heights, such that the LED strips would be received at different heights.

Figure 5:
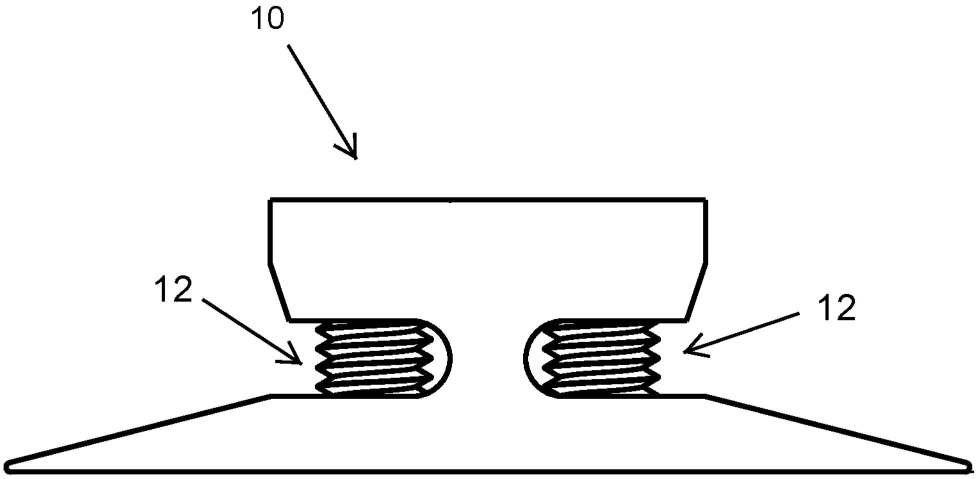
FIG. 5 is a side view of an embodiment of an LED connector system.
Figure 6:
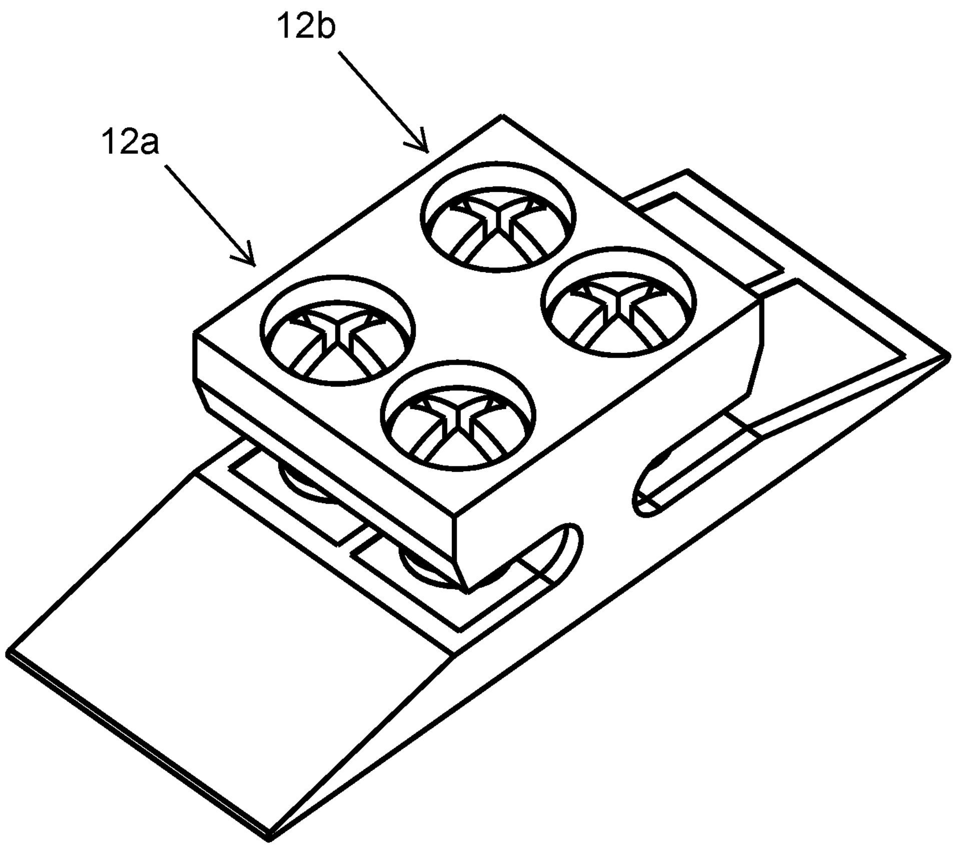
FIG. 6 is a perspective view of the LED connector system of FIG. 5.

As can be seen in FIGS. 5 and 6, threaded screws 12 may be inserted through an upper surface of the connector body 10 and screwed into the LED conductors 14 (shown in FIG. 2) to secure items disposed below the screws 12. In the embodiments shown, the top surface of the connector body 10 has four holes bored therethrough that are sized to accept the threaded screws 12. The configuration of the holes may differ in other embodiments. In some embodiments, the sidewalls of the holes may be smooth or may be threaded. As shown in FIG. 6, a first set of screws 12*a* may be used to secure a first component (not shown) inserted into a first slot of the connector body 10, such as a first LED strip or first set of wires, and a second set of screws 12*b* may be used to secure a second component (not shown) inserted into a second slot of the connector body 10, such as a second LED strip or second set of wires.

Figure 7:
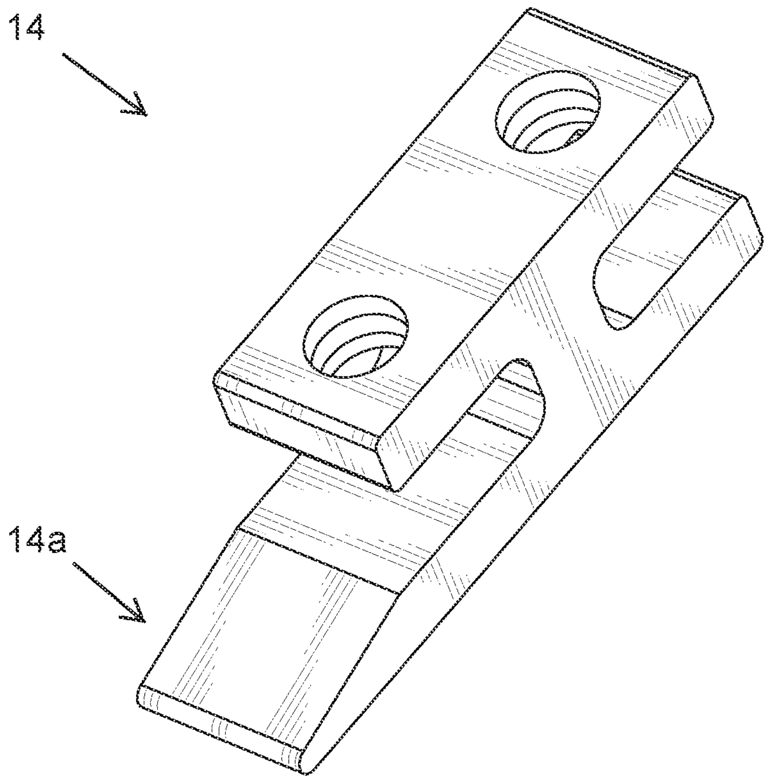
FIG. 7 is a perspective view of an embodiment of an LED conductor of the LED connector system of FIG. 2.

Referring now to FIG. 7, an embodiment of an LED conductor 14 configured to be inserted into a channel of a connector body 10 is shown. In various embodiments, two LED conductors 14 inserted into the connector body 10 partially span the length of the connector body 10, providing an electrical bridge between the first side and the second side of the connector body 10. The LED conductors 14 may be electrically conductive, made, for example, of a metal such as, aluminum, copper, steel, or an alloy, such as a beryllium-copper alloy. On the first side, the LED conductor 14 has a ramp 14*a* with a downward slope projecting outwardly from a generally U-shaped receiving portion. On the second side, the LED conductor 14 has a U-shaped receiving portion without the ramp extending therefrom. In some embodiments, the LED conductor 14 may have ramps on both sides or on neither side. In some embodiments, the LED conductor 14 may include a flexible and/or biased portion that may be biased toward engagement with an electrical contact of an LED strip, a wire, and/or a screw received within the U-shaped receiving portion.

In operation, the LED conductors 14 would be inserted into channels 10*b* (FIG. 2) in the connector body 10. As can be seen in FIG. 2, the channels 10*b* may be configured to receive the LED conductors 14 such that holes in the upper surface of the connector body 10 align with holes in the upper surface of the LED conductors 14. Next, an LED strip 102A (FIG. 1) inserted into a first side of the connector body 10 would rest on the ramp 10*a* and wires and/or a second LED strip 102B (FIG. 1) would be inserted into a second side of the connector body 10 and rest on the ramps 14*a* of the LED conductors 14. A screw 12 would then be inserted into each of the holes in the upper surface of the connector body 10 and tightened to secure the LED strip and/or wires to the LED conductors 14 within the connector body 10 to create an electrical connection between a first electrical contact of the LED strip 102A and a first electrical contact of the LED strip 102B and a second electrical contact of the LED strip 102A and a second electrical contact of the LED strip 102B, while electrically isolating the first electrical contacts from the second contacts of the two LED strips. While LED conductor 14 is shown as being a single-piece component, its function may be performed by several pieces in electrical communication with one another. The connector body 10 and LED conductors 14 according to various embodiments may take various forms in order to connect an LED strip to an LED strip (FIG. 1), an LED strip to one or more sets of wires (not shown), or sets of wires to other sets of wires (not shown), or any combination thereof. The LED conductors 14 may include, in any combination, the features of the first side and/or the second side described above and may be configured to slide into channels in a plurality of different connector body 10 shapes and sizes.

Figure 8:
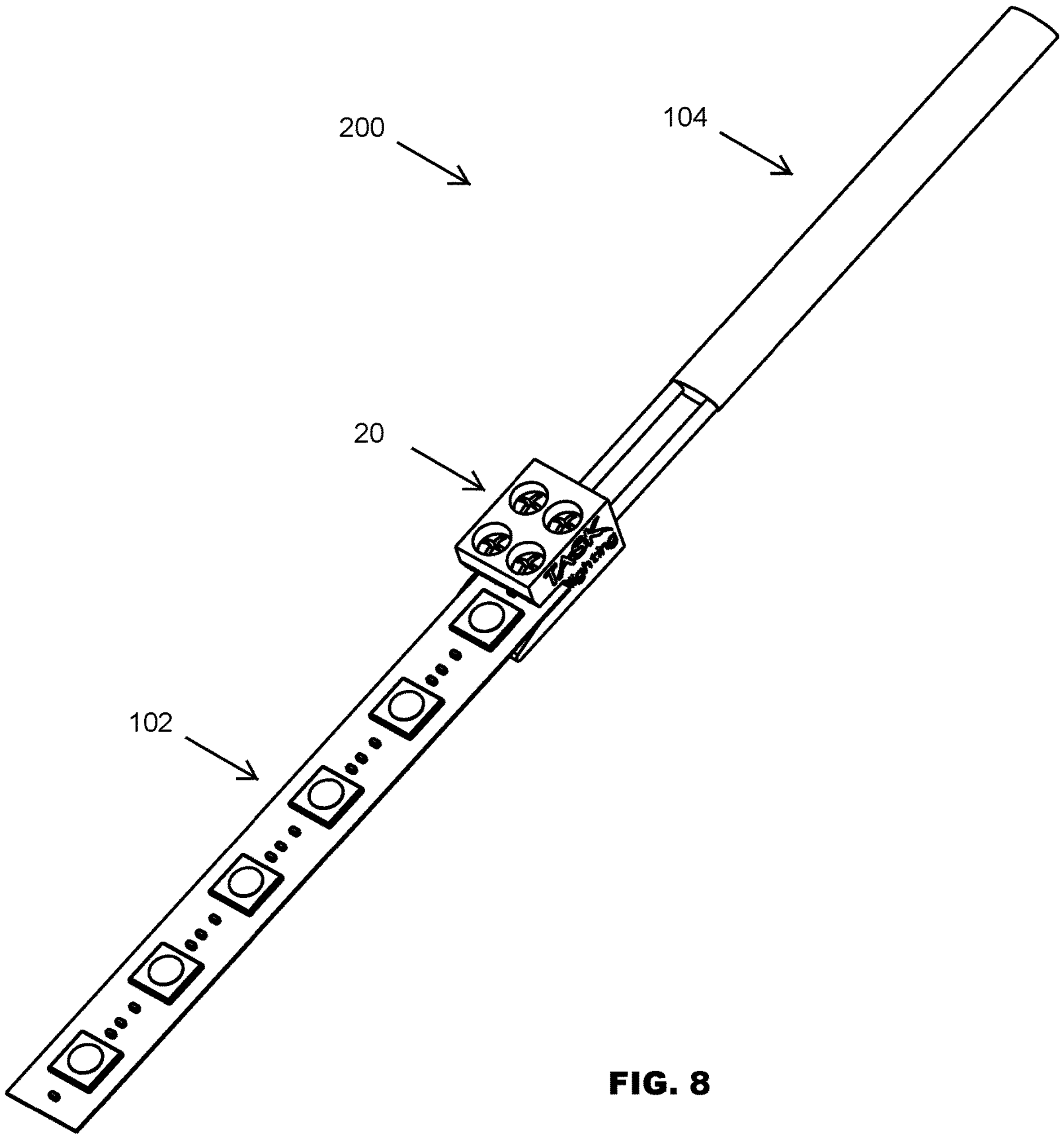
FIG. 8 is an LED connector coupled to an LED strip and wires in accordance with an alternative embodiment of the present invention.

FIG. 8 is a perspective view of an alternative embodiment of an LED connection system 200 having an LED connector body 20 coupled to an LED strip 102 and two electrical contacts of an electrical component 104, such as wires from a power source or control module. The connector body 20 may be constructed and arranged to connect a strip of linear lighting to wires, to connect a strip of linear lighting to another strip of linear lighting (not shown), or to connect two sets of wires (not shown). The embodiment shown is configured to make two electrical connections, but in other embodiments, there could be any number of electrical connections made. Typically, the first set of wires 104 and/or electrical connections of a first LED strip would carry power to the second set of wires and/or electrical connections of a second LED strip 102. However, the type of power and/or signal that the wires and/or connections carry may vary. For example, LED strip 102 may require a power source and additional signals for control and may thus require additional wires and/or other inputs.

Figure 9:
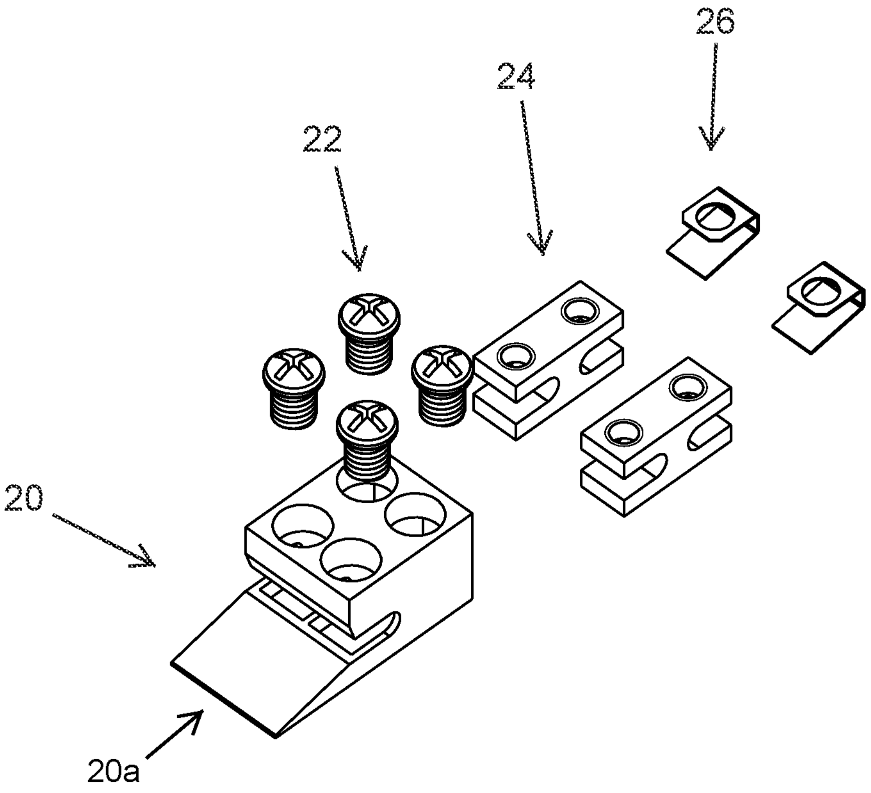
FIG. 9 is an exploded perspective view of an LED connector system in accordance with an alternative embodiment of the present invention.

Referring now to FIG. 9, an embodiment of LED connection system 200 is provided having a connector body 20, screws 22, LED conductors 24, and conductive clips 26. To facilitate the U-shaped portions of the LED conductors 24 to receive and secure wires therein, the pair of electrically conductive clips 26 may help to secure the wires (FIG. 1) on the second side of the connector body 20. The electric contact clips 26 may have an upper portion with openings sized to allow the screws 22 to pass. Thus, as can be seen in FIG. 9, the screws 22 may be inserted through the holes in the upper surface of the connector body 20, through the openings in the upper surface of the clips 26, and tightened to secure the wires (not shown) therein.

Figure 10:
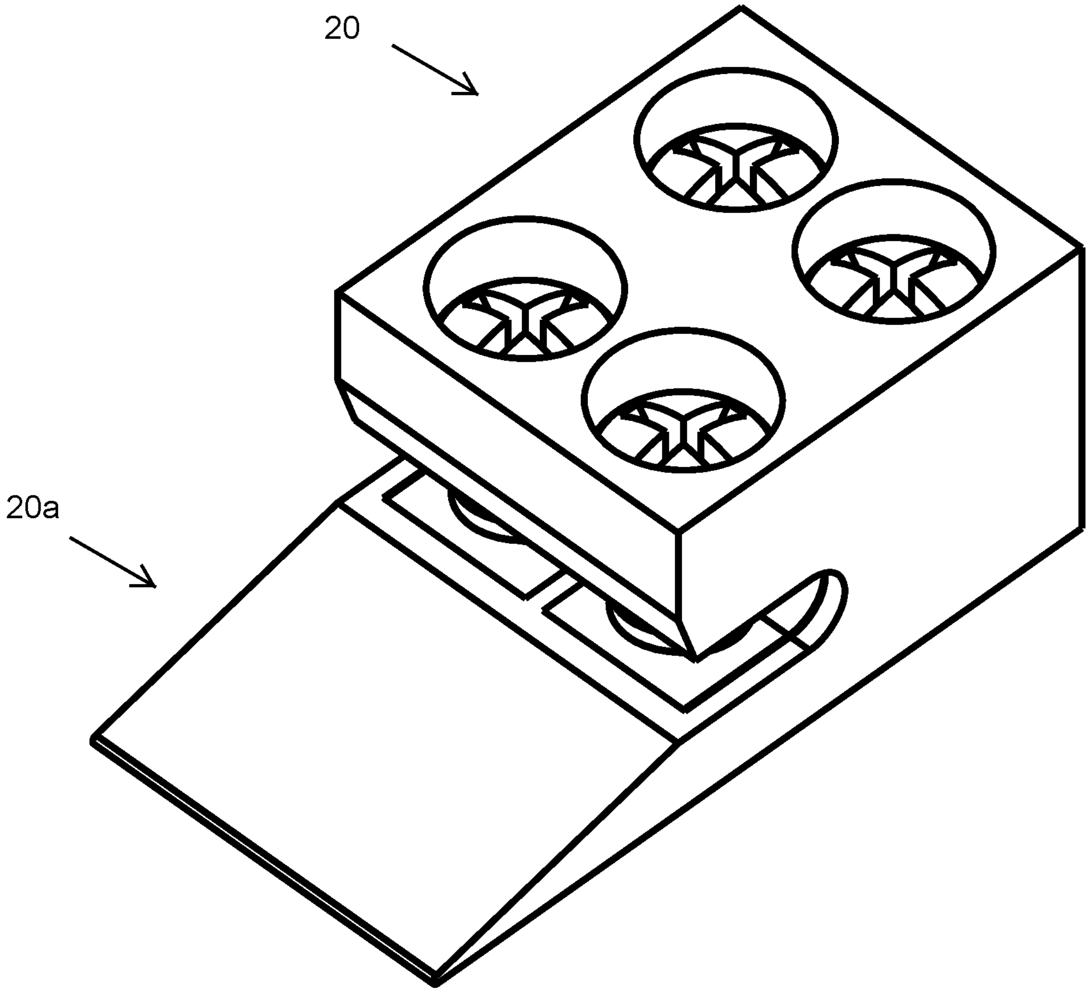
FIG. 10 is a perspective view of the LED connector system of FIG. 9.

As can be seen in FIGS. 9 and 10, a first side of the connector body 20 has a sloped ramp 20*a* to provide a support surface for an LED strip (not shown) inserted into the first side of the connector body 20. The connector body 20 is adapted to receive an end of the LED strip (not shown) and the support ramp 20*a* extends outwardly from the connector body 20 to support the LED strip near the connector body 20. The LED strip may be attached to the surface of the support ramp 20*a* thereby preventing movement of the LED strip with respect to the connector body 20. Oftentimes, LED strips include an adhesive strip on a bottom surface thereof. For other embodiments, an adhesive strip may be disposed on the support ramp 20*a*. In some embodiments, an adhesive strip may be disposed on a bottom surface of the connector body 20 to facilitate, for example, mounting the connector body 20 to a base surface or other object. Alternatively, a separate adhesive not part of the LED strip or connector body 20 may be applied between the backside of the LED strip and/or the support ramp 20*a* and/or applied to the bottom surface of the connector body 20. In various embodiments, soldering may be utilized in addition to or in lieu of screws or other biasing members.

In some embodiments, a plurality of connector bodies may be utilized either attached to one another, either horizontally or vertically, or formed from a unitary structure to provide for a splice connector that allows for the connection of a plurality of LED strips together. For example, a splice connector comprised of two connector bodies essentially perpendicular to each other in a cross shape such that three or four LED strips could be coupled together to, for example, share a common power supply. Alternatively, two or more of the LED strips could be coupled together in series or in parallel, depending on the internal configuration of the connector bodies, thereby allowing sharing of the same power supply. In some embodiments, the connector body may include only a single channel or may include three or more channels.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. An LED strip connector comprising:

a non-conductive connector body having:

first and second channels extending at least partially through the non-conductive connector body;

a top surface having a first set of apertures therethrough disposed over the first channel and a second set of apertures therethrough disposed over the second channel;

a first side for receiving a first electrical component;

a second side for receiving a second electrical component;

a non-conductive divider between the first and second channels; and a sloping ramp extending outwardly from the first side;

a first conductor having an upper portion, a lower portion, and two oppositely facing U-shaped receiving portions between the upper portion and the lower portion each having a threaded aperture through the upper portion, the first conductor being configured to slide into the first channel such that the threaded apertures thereof are generally aligned with the first set of apertures in the top surface of the non-conductive connector body; and a second conductor having an upper portion, a lower portion, and two oppositely facing U-shaped receiving portions between the upper portion and the lower portion each having a threaded aperture through the upper portion, the second conductor being configured to slide into the second channel such that the threaded apertures thereof are generally aligned with the second set of apertures in the top surface of the non-conductive connector body.

2. The LED strip connector of claim 1 and further comprising:

a plurality of screws for securing the first electrical component and the second electrical component within the non-conductive connector body.

3. The LED strip connector of claim 2, wherein, when the first electrical component is received in the first side and the second electrical component is received in the second side, the plurality of screws urge contact between the first and second electrical components and the first and second conductors to secure the first and second components therein and electrically couple the first electrical component to the second electrical component.

4. The LED strip connector of claim 1, wherein the first conductor provides a first electrical connection between the first side and the second side and the second conductor provides a second electrical connection between the first side and the second side.

5. The LED strip connector of claim 1, wherein the first electrical component is a connecting end of an LED strip.

6. The LED strip connector of claim 1, wherein the sloping ramp provides support to a lower surface of the first electrical component when received within the non-conductive connector body.

7. The LED strip connector of claim 1, wherein the first and second conductors each have a sloping ramp extending outwardly from a lower portion thereof.

8. The LED strip connector of claim 7, wherein, when the first conductor is in the first channel, the second conductor is in the second channel, and the second electrical component is received in the second side of the non-conductive connector body, the sloping ramps of the first and second conductors provide support to a lower surface of the second electrical component.

9. The LED strip connector of claim 1, wherein the lower surface of the non-conductive connector body is generally planar.

10. The LED strip connector of claim 1, wherein a top surface of the sloping ramp of the non-conductive connector body is generally planar.

11. The LED strip connector of claim 1, wherein, when the first conductor is in the first channel, a first screw may be inserted through a first aperture of the first set of apertures in the non-conductive connector body and a first threaded aperture of the threaded apertures of the first conductor to at least partially secure the first electrical component received in the first side of the non-conductive connector body.

12. The LED strip connector of claim 2 and further comprising:

a conductive clip having a hole extending at least partially therethrough, wherein, when inserted into the U-shaped receiving portion of the first conductor, a screw of the plurality of screws may pass through the hole to bear down on the first electrical component received in the first side of the non-conductive connector body.

13. A connector for an LED strip, comprising:

a housing having a top surface, a bottom surface, a first side, a second side, first and second channels between the top surface and the bottom surface and extending from the first side towards the second side, a non-conductive barrier disposed between the first and second channels, wherein the top surface has a first set of apertures disposed over the first channel and a second set of apertures disposed over the second channel;

first and second openings in the first side corresponding to the first and second channels;

first and second removable conductors each comprising two back-to-back generally U-shaped portions, wherein each generally U-shaped portion has an aperture through a side thereof;

the first removable conductor configured to be removably disposed within the first channel and the second removable conductor configured to be removably disposed within the second channel;

wherein, when the first and second removable conductors are disposed within the first and second channels, the apertures in the generally U-shaped portions of the first removable conductor are generally aligned with the first set of apertures in the housing and the apertures in the generally U-shaped portions of the second removable conductor are generally aligned with the second set of apertures in the housing; and first and second electrical contact clips configured to be inserted into the U-shaped portions of the first and second removable conductors and adapted to be driven down into engagement with an electrical component received within the first side by a first set of screws that bear on surfaces of the first and second electrical contact clips.

14. The connector of claim 13, wherein the housing is adapted such that when assembled with an end of an LED strip light received within the first side and first and second wires received in the second side, the first removable conductor makes a first electrical connection between the first wire and a first electrical contact of the LED strip light and the second removable conductor makes a second electrical connection between the second wire and a second electrical contact of the LED strip light.

15. The connector of claim 13, wherein the first side of the housing includes a ramp extending from a lower portion thereof.

* * * * *